Aug. 16, 1966  L. A. BORIOLO  3,266,935
METHODS FOR PRODUCING PLATE SHEATHS FOR STORAGE BATTERIES
Filed Oct. 2, 1962
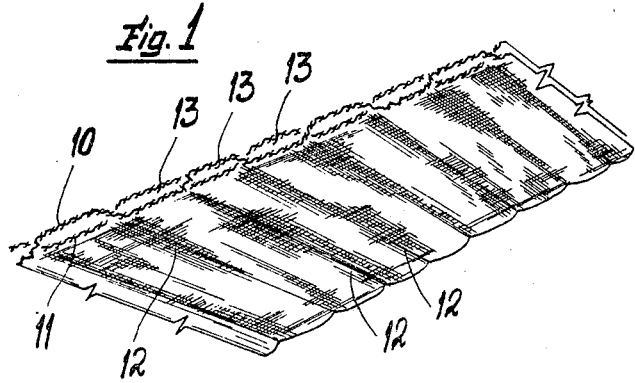
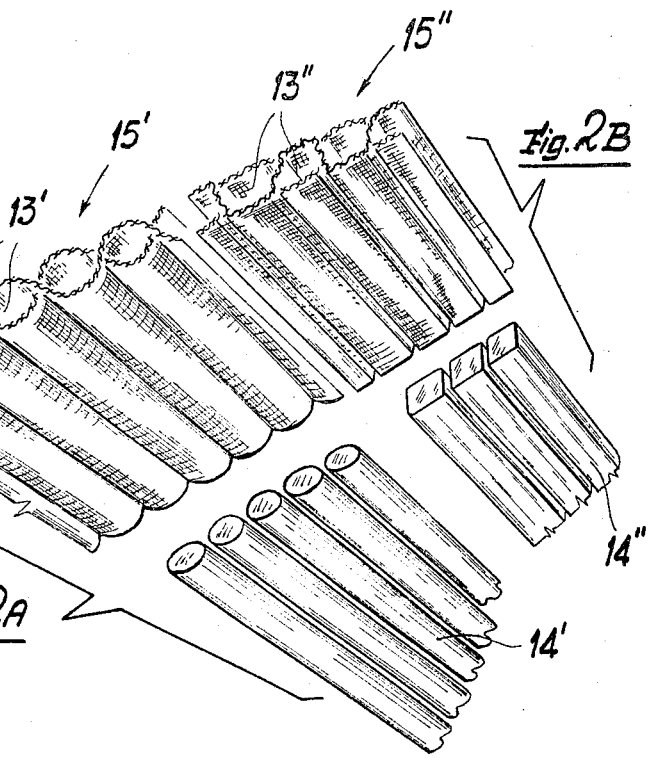
INVENTOR.
Lino Alessandro Boriolo
BY Michael S. Striker
Attorney

United States Patent Office 3,266,935
Patented August 16, 1966

3,266,935
METHODS FOR PRODUCING PLATE SHEATHS
FOR STORAGE BATTERIES
Lino Alessandro Boriolo, 1, Via Giusti, Cinisello Balsamo, Milan, Italy
Filed Oct. 2, 1962, Ser. No. 227,785
Claims priority, application Italy, Oct. 6, 1961, 18,054/61
2 Claims. (Cl. 136—43)

This invention generally relates to improvements in or relating the methods for producing plate sheaths for electric secondary or storage batteries and, more particularly, it is related to a new and improved method for producing plate sheaths of textile material having a plurality of parallel, spaced and shaped pockets integrally formed thereinto, each of said pockets being intended to form a cell and to enclose a pencil of active material positioned about an individually axially arranged conductive spine.

This invention is further related to new and advantageous plate sheaths of the aforementioned type, constructed of suitable acid-resisting thread material and processed according to such method to actuate a self-sustaning plate sheath having a plurality of cells integrally formed thereinto at a given exactly predetermined relative position and having a given exactly predetermined size and shape, and therefore adapted for forming the said individual pencils in each cell, by pouring thereinto the active material in powder or finely granulated form, and then mechanically treating such material in said cells, by subjecting the same to vibration, for example, for having said material compacted about the said individual conductive and axially arranged spine and in firm and intimate contact with textile sidewall of said cells.

As fully disclosed in my prior U.S.A. Patent No. 2,972,000 I have heretofore invented and provided a new and advantageous textile sheath of such type, wherein each of the said individual cells thereof is formed and set in its given shape and dimensioned for directly forming the pencils of active material thereto, and wherein the textile material is made self-supporting by curing or processing steps in the required shape and dimension of the said individual cells and in the predetermined intervals therebetween.

According to said my prior invention, I have found that such advantageous plate sheaths may be manufactured by the steps of preparing a fabric from heat-shrinkable thermoplastic substantially acid-resistant thread material, having therein a plurality of pockets of predetermined shape and relative position, said fabric and said pockets being in collapsed condition and respectively of greater size than the desired given size of the cells to formed in the processed sheath, of subjecting said fabric to a temperature sufficient to shrink said fabric while limiting shrinkage of the said pockets to said desired given size and predetermined shape, and of cooling said fabric below said temperature, whereby a shape-retaining structure having cells of said desired given and predetermined size and shape is obtained.

Preferably the said shrinkage is limited by means of forming rods or bodies previously and individually inserted in each pocket, said forming bodies being sized and shaped to determine the desired size and shape of the inner faces of the cells to be obtained, and the said heating step is preferably but not necessarily actuated by making use of said forming bodies as heating means, for example by providing tubular forming rods having individual resistors arranged thereinto, and by connecting the terminals of said individual resistors to a feeding circuit while said forming rods are individually inserted within each of said pockets.

Further according my said prior invention, I have found that a fabric of heat-shrinkable character and capable of modify its original collapsed or flabby condition, when heat-shrunk and when its shrinkage is limited in respect to the shrinkage of same material, if subject to same heat treatment but if such shrinkage would not be anyway contrasted, into a substantially self-supporting or shape-retaining condition, may be made of thread material consisting of fibers of thermoplastic material selected from the group consisting of acrylic resins and vinyl chloride-acrylonitrile copolymers.

From another point of view, according my said prior invention, I have found that certain thermoplastic thread materials, namely selected from the group consisting of acrylic resins and vinyl chloride-acrylonitrile copolymers, may be made use of for producing a textile structure which is originally in a collapsible or flabby condition, and which may be made effectively self-supporting and shape-retaining if heat processed to cause the shrinkage thereof, if the said shrinkage is contrasted and limited in the size and shape to be retained.

The above expressions "self-sustaining" and "shape-retaining," as applied to define the status of the processed material, are hereby intended to indicate, in this disclosure and in appended claims, a somewhat rigid condition which causes the produced sheaths and the cells integrally formed thereinto to maintain their size, shape and relative spacings at least as required for successively forming the pencils of active material thereinto, i.e. for producing the storage battery plate, adapted for service.

Now, according to prior art, including the teaching from my said prior patent, it might be assumed that, for producing textile plate sheaths of the type referred to above, which are advantageously made shape-retaining by applying my prior method, as above discussed, the fabric material to be processed must necessarily possess both the following summarized properties:

(a) Being acid-resistant and incapable of giving up chlorine and chlorine derivatives when exposed to the operating conditions of an electric storage battery, at least within the reasonable limits required for proper and safe service of such battery;

(b) Being capable of acquiring the above discussed and defined shape-retaining condition upon heat-shrinkage in shrinkage-limiting conditions, such property including obviously that material is positively heat-shrinkable and that its physical status will be substantially modified as the shrinkage thereof is suitably contrasted.

According to common knowledge of those skilled in the art to which this invention appertains, a number of synthetic polymers is known, which possess at the most desirable degree the properties indicated above at (a), and which might be satisfyingly made use of for providing a textile material having the character of stress-resistance, resiliency and other mechanical properties required for extensive and safe service of a plate sheath for electric batteries, and further which are positively heat-shrinkable, but which do not possess or at least do not possess at the required extent the property above indicated at (b), i.e. which cannot be satisfyingly made use of for producing satisfyingly self-supporting and shape-retaining textile sheaths, by applying and making use of the principle of modifying the physical status of the fabric by heat-shrinking processing in a shrinkage-limited condition.

From the above point of view, known polymers which are of particular interest in art belong to the group of synthetic linear polyesters, such as polyesters derivatives of aromatic dicarboxylic acid, and particularly of homologues of phthalic acid, typically of terephthalic acid, and glycols, typically ethylene glycol and other aliphatic glycols.

At any rate, and in consideration of the scopes, objects and new and surprising results of this invention, as indicated hereinbelow, it is to be intended that is to be considered and comprehended, within the group of materials which possess at the necessary extent the required properties for satisfying utilization thereof in producing plate sheaths of the type described, except the ability of being made shape-retaining upon the above discussed contrasted or resisted heat-shrinkage processing, at least at the extent required for the said utilization thereof, any polyester which may be characterized by the property, well known in the art, to be stabilized, upon heat either dry or wet way treatment, under free or confined conditions, at a temperature not higher than a given value which, in the case of ethylene polyterephthalate, for example, is of 90° to 100° C. about, however maintaining the property or ability of further substantially shrink, at the extent of 10% or even more, and ever in an undisturbed condition, upon further heating at a temperature higher than said given value, said higher temperature being of 160° to 190° C. about in the case of ethylene polyterephthalate.

It is further intended that, while in the following disclosure reference will be made to polyesters, any other polymer which may be characterized as above will be comprehended within the meaning and range of equivalents of the invention, in particular as defined in and by the appended claims.

Having the above and other considerations and premises in mind, it is therefore an object of this invention to provide a new and improved method for the manufacture of textile plate sheaths of the type referred to above, possessing the above discussed physical status or condition of being self-supporting shape-maintaining, by making use of synthetic materials as above defined and characterized, and more particularly of linear polyesters of the above type, to produce the prevailing and essential portion, i.e. the prevailing and essential component of the thread material from which the textile structure is manufactured.

It is therefore another object of this invention to provide a new and advantageous article of manufacture, particularly an improved textile plate sheath having a plurality of cells of a given exactly predetermined size, shape and relative position, and formed of woven thread material whose prevailing component consists of at least one linear polyester resin as above defined and characterized, and having a texture made self-supporting and shape-retaining at the extent required for formation of the said individual pencils of active material into the cells thereof, and thus making unnecessary any further ancillary means or provision to maintain such texture in the said shape, size and relative position of the cells included therein, at least during completion of the battery plate, and preferably such to essentially maintain its said shape, size relative position during the service of said battery plate into a storage battery.

According to the invention, the above and other new and advantageous objects are substantially attained by impregnating a textile material, particularly a thread material, made of a linear polyester as above defined and which possesses all and any the required properties, except the ability of being made shape-retaining upon contrasted heat-shrinkage, with a resin such that, if provided in thread form having an oriented linear molecular structure, will possess said latter ability of acquiring a substantial shape-retaining condition upon contrasted heat-shrinkage, and then by subjecting the such impregnated textile material to heating at a temperature such that said material is caused to substantially shrink, while the resulting shrinkage is contrasted and limited—whereby a textile structure, including the said linear polyester as the prevailing component thereof, is produced, the said structure possessing any and all the above said required properties and further the said desired shape-retaining condition, in a texture including cells of the predetermined size, shape and relative position, as defined by the size, shape and relative position of the means provided for contrasting and limiting the said shrinkage thereof.

According to the invention, before the said contrasted heat-shrinkage processing of the material, the thread component thereof is subject to a fixing or stabilizing step at a temperature lower than the temperature of substantial heat-shrinkage, so that the said ability of the material of further substantially shrink will not be prejudiced, the said step being performed in condition either of free or undisturbed or of partially or even fully contrasted shrinkage.

It had been ascertained and surprisingly found that the above described textile article of manufacture, namely embodying a plate sheath for storage or secondary batteries, quite satisfyingly possesses the said desirable self-supporting and shape-retaining property, together with the required chemical and mechanical characters in view of reliable and durable service of the plate in an electric storage battery.

Preferably, the impregnating resin capable to attain the said new and surprising results, might be selected from a group consisting of vinyl polymers and copolymers, such as acrylonitrile copolymers, and vinylic esters, such as vinyl chloride or also polyvinyl chloride, the selection of such resin or resins being obviously made upon consideration of the particular service of the produced sheath, particularly in view of limiting, within acceptable extent, giving up of chlorine and chlorine derivatives, during battery service.

The temperature at which the desirable fixing or stabilizing step and the essential and critical contrasted heat-shrinking process are to be carried out, must be obviously choosen upon consideration of the known data and characteristics typical of the utilized materials, such well known data and characteristics including in particular the temperature values and ranges whereat and wherein the shrinkage in undisturbed condition occurs, and the extent, conventionally termed in percent, of such shrinkage at differing temperatures.

At an rate, the ratio of the temperature of the fixing step (which, as above said, is not strictly necessary but desirable) in respect to the temperature of critical contrasted shrinkage process, must be such that during said latter process the further heat applied to the material could cause a substantial further shrinkage of the texture. The extent of such further shrinkage might desirably be of 10% at least, if measured when such shrinkage is undisturbed, i.e. not mechanically contrasted, while the actual shrinkage admitted by the forming bodies, during the critical contrasted heat-shrinking process, will be obviously smaller, of 3% or 4%, for example.

The temperature at which the said critical contrasted heat-shrinking process is performed must be at least of the value of the temperature at which a thread, consisting of the said impregnating resin in condition of linearly oriented resin, would be made self-supporting and shape-maintaining, if subject to a contrasted heat-shrinking processing. Said former temperature, however, might be higher than the said latter temperature, if desired, provided that the desired chemical and physical character of the resin should not be prejudiced.

Said conditions are satisfied, for example, in the case that the texture is formed of threads of ethylene polyterephthalate impregnated with a resin consisting of vinyl chloride-acrylonitrile copolymer, by processing such texture at a temperature in the range of 160° to 190° C. about.

The new and surprising advantageous results of this invention are sharply antithetical to what could be logically expected upon a consideration of the well known character and behaviour of the above considered materials. In fact, it should be logically expected that the substantial hardening of a resinous thread material, upon contrasted heat-shrinking processing thereof, was mainly a consequence of the substantial linear orientation of the molecules in the fibrous material, longitudinally to the fibers.

It should be indeed expected that a textile structure of the type considered might be shaped and made shape-retaining, upon the above discussed contrasted heat-shrinking processing thereof, provided that such structure should be produced from threads which include fibers of a hardenable resin by contrasted heat-shrinking of the material, as a prevailing component thereof, while one could not reasonably expect that such substantial hardening will occur when the said impregnating resin has not been previously transformed in a fibrous condition and as a linearly oriented polymer or copolymer.

In addition, it has been surprisingly found and ascertained that a quite satisfying hardening of the material, such as required to produce a satisfyingly self-supporting and shape-retaining textile structure, in view of the manufacture of storage battery plates, may be properly attained by making use of said impregnating resin as an additive of polyester fibrous material, and as a very minor component of the structure. In effect, according to an important feature of this invention, it has been found and ascertained that the ratio "polyester to additive resin" in the produced article, is ever lesser than 10 to 1, in weight, and that the weight of the additive resin actually is comprised in the range of 2% to 8%, of the total weight of the produced article.

Very satisfying results have been attained by impregnating a polyester textile material with a vinylic resin which, in the produced article, represents the 4% to 5% only of the weight of such article of manufacture.

Such ascertained result is even more surprising upon a consideration of the fact that, assuming to combine, in a textile structure, a first hardenable thread or fibrous material with a second not hardenable thread or fibrous material, for enjoying the ability typical of said first material to make the said structure self-supporting and shape-retaining upon the said contrasted heat-shrinking processing, one skilled in the art might expect that the extent of the obtainable hardening would be essentially proportional to the percentage of first material in the compound. If a percentage so low as 4% to 5% should be taken into consideration, a substantially negligible hardening would be logically expected.

According to a further feature of this invention, the linear polyester made textile material may be impregnated with the resin by dissolving or otherwise dispersing such resin into a liquid medium adapted to be eliminated prior to completion of the article, and by causing said dissolved or otherwise dispersed resin to impregnate the material. Such liquid dispersing medium may advantageously consist of a typical solvent of the utilized resin, said solvent being obviously selected from a group including the solvents which might be eliminated without giving up compounds or substances which might prejudice the article or otherwise objectionably acting in any following processing step.

For example, an impregnating resin of vinylic nature may be advantageously dispersed in a liquid medium consisting of commercial acetone, which is well known as being widely available commercially at low cost, provided that no objectionable effects have been ascertained in making use of such liquid medium. Other dispersing mediums might be however made use of, such as cyclohexanone, carbon disulphide, methyl sulphide, for example, and mixtures thereof with acetone.

Strictly theoretically speaking, it should be desirable to use a solvent which might readily and completely dissolve the resin while not being capable of acting on the polyester textile material. It has been however found that a strict obeyance to such condition is not practically required, considering that such resins require at their turn some provision to facilitate their full solution or dispersion into the liquid medium.

For example, if the impregnating resin consists of a vinyl chloride-acrylonitrile copolymer, such as scrap material from fabrics or textures of such copolymer, for example of the copolymer of fifty-fifty about composition, known in the trade as "Dynel" (a registered trademark), a satisfyingly finely dispersed and concentrated solution may be practically obtaining upon heating only.

Therefore, if the step of impregnating the polyester material with solute resin is performed at room temperature and if the solvent or dispersing liquid medium is eliminated within a relatively brief time after impregnation, no practically perceptible interaction will occur between said polyester material and said liquid medium. Besides, a somewhat slight surface attack by the solvent on the polyester material has been found as being not harmful in respect of satisfying manufacture of the new article and, in addition, it is believed that such slight surface attack might improve the intimate combinaiton of the prevailing polyester component of the material with the additive resinous components.

The procedure and the time, with respect to the complete procedure of manufacture, of the impregnation step, are not strictly critical of the invention, provided that such step would be carried out before the above discussed contrasted heat-shrinking process, upon which the article is made self-supporting and shape-retaining in its desired given and exactly predetermined size, shape and relative position of the cells integrally formed therein. In some cases the said impregnation step might be advantageously carried out on the woven fabric having the said pockets integrally formed therein, when said fabric is still in its original collapsible and flabby condition. The various relative movements of the woven threads in the fabric, caused by the several handlings and manipulations of the material, such as the insertion of the forming bodies in the said pockets thereof, and particularly by the subsequent contrasted shrinkage, will ensure the elimination of any possible stitching and clogging of the fabric.

According to a preferred form of embodiment of the invention, however, the said impregnation step is carried out on textile polyester material when still in its thread form, i.e. before the loom weaving of said material into the fabric or texture having the said pockets formed therein. In addition, the impregnation of the said thread material might be advantageously carried out before the fixing or stabilizing steps of the twist of said thread material, so that during said latter steps the solvent or dispersing liquid medium might be at least partially and even wholly eliminated. The said impregnation step may be carried out according to widely known procedures, such as by passing the fabric or the thread into a bath of said impregnating liquid medium, and therefore such step will not be described in detail.

The above described carrying out of the impregnating step of polyester textile material when still in thread form, leads to a further advantageous feature of the invention. It has been found indeed that the said impregnating medium or agent will favourably act, in view of the subsequent manipulations of the material, in particular of the mechanical processing thereof in a loom, for weaving same in the desired texture, as an effective sizing agent. As known to those skilled in art, properly sized threads can be mechanically processed a great deal faster and safer than not sized threads, which might require further costly over-twisting treatments for improve the weaveability thereof.

Such sizing effect, as resulting from the same impregnation step of the textile material, which is essential and critical of the invention, has been proved as particularly useful when the textile thread consists of continuous filaments, as the polyester made threads typically are, thus combining the well known advantages of such threads with the improvement of the weaveability thereof, which, as known, might be prejudiced by the possible breakage of individual filaments when the thread had not previously been over-twisted or properly sized, while such ancillary and relatively costly treatments are not required in carrying out the invention, owing to the feature that the said impregnation step will effectively substitute a suitable sizing of the threads, in view of the weaveability thereof.

Other features and advantages of my invention are in part obvious and in part will be made apparent as this description proceeds. The novel features which are considered as characteristic for the invention are set forth in particular in the appended claims. The invention itself, however, both as to its construction and to the method for carrying out the same, will be best understood from the following detailed description of a specific embodiment thereof, when read in connection with the accompanying drawing, forming an essential component of this disclosure, and wherein:

FIG. 1 is a perspective diagrammatical showing of texture having a plurality of parallel pockets integrally formed thereinto, and corresponding to the showing of FIGS. 1 and 2 of my said prior Patent No. 2,972,000, i.e. a textile material adapted to be subsequently processed for shaping and making the same self-supporting and shape retaining, upon application of the above discussed contrasted heat-shrinking process;

FIGS. 2A and 2B are fragmentary perspective, diagrammatical exploded views of two forms of embodiment of self-supporting and shape retaining plate sheaths which may be produced by making use of the collapsible texture of FIG. 1, upon the application of the above said process, and of the forming bodies about which the cells of said sheaths are contrastedly shrunk and formed.

Referring now to the drawing: a texture as shown in FIG. 1 includes two oppositely located texture portions 11 and 12, respectively, which are interwoven at parallel and evenly spaced lines 12 to form parallel pockets 13 therebetween. By carrying out the above discussed contrasted heat-shrinking process, such texture may be transformed in the desired self-supporting and shape-retaining article including cells sized as required. Such article might include cylindrical cells as shown at 13' in FIG. 2A, or differently shaped cells, such as quadrangular cells as shown in 13'' in FIG. 2B, for example. The size, shape and relative position of said cells such as at 13' or 13'' are determined by the size, shape and spacing of respective forming bodies such as at 14' and 14'', respectively, which are individually located inside the said collapsible pockets 13 of the texture, and about which the sidewall of each pocket is caused to shrink and stressingly contract during the said contrasted heat-shrinking process.

It is obvious that the nature and composition of the threads, the weaving of the fabric and the mode of carrying out the various steps and processings, are to be determined in view of several factors, such as the size of the cells to be formed, the porosity of the sidewalls thereof, and the various requirement to meet in respect to the mecahnical resistance, resiliency and chemical resistance of the plate sheath to be produced. Few examples of typical forms of embodiment of the method of carrying out the present invention will be detailedly set forth hereinbelow.

Example 1

There is assumed that plate sheaths having cylindrical cells are to be produced, and that such cells have an inner diameter of eight millimeters (8.0 mm.) and evenly spaced at an interval of 9.6 mm. between the axes of adjacent cells. Such plates are to be cut from panels of the processed texture, into pieces of 212 mm. by 145 mm. for example. The size of said individual piece, i.e. the height and the width of the individual plate sheath is however not critical in view of the selection of the data referred below, while such selection is influenced by other factors, namely the cells' cross-sectional size, the spacing thereof and the various mechanical and chemical requirements.

A commercially available yarn has been made use of, consisting of ethylene polyterephthalate, produced and sold in Italy under the name "Terital" (a registered trademark), of 125 denier, type "A.R." (meaning "high resistance"), including 24 parallel filaments and three-stranded left-hand twisted at 400 convolutions/meter. According to known data, such yarn is subject to self-contraction of 18% to 20% when heated at 180 C., under "free" or not contrasted or disturbed condition.

Such yarn has been subjected to stabilization or fixing of its twist, while loosely wound about a bobbin, at a temperature not higher than 85° C., preferably of 80° C. As a consequence of such step, the yarn has been subject to a contraction in the range of 3.0% to 3.5%; therefore, upon such fixing step, the yarn was still capable of further self-contraction to an extent of 15% to 17% about, at 180° C. in freely contracting condition.

An impregnating component has been provided, by dissolving tailings, scraps and like waste material from working fibers, yarns, threads and textures of "Dynel" (a registered trademark), a commercially available resinous material consisting of a vinyl chloride-acrylonitrile copolymer. As a dispersing liquid medium commercially available acetone has been made use of. The dispersing bath has been so batched that it included 95% of acetone and 5% of dispersed resin, in terms of weight. The dispersing step had been carried out at 40° to 45° C. and completed within 40 to 45 minutes. The full dissolution of the resin may be improved and facilitated by continuous stirring of the bath.

The impregnation of the yarn has been carried out by rapidly passing same in said bath, and then such passage has been immediately followed by squeezing the yarn between calendering rollers and by subjecting said impregnated yarn to air stream at room temperature, for substantially completing of the elimination of the dispersing medium. The yarn prepared and processed as above was now ready for loom working of the texture, and the weaveability has been ascertained as quite comparable to the weaveability of conventional properly sized yarn of corresponding nature.

The weaving of the texture has been made on a conventional dobby loom, adjusted for producing a twin fabric, according to the art. The weaving has been carried out by using 34 warp yarns by centimeter and beating up at 33 beatings by centimeter, and reversing about two yarns at the locations of interweaving between adjacent pockets, the adjustment being so made that each pocket has been formed with sidewalls including 25 yarns at each side. Upon measurement of the flabby texture, it has been found that by cylindrically shaping the flabby sidewall of any pocket integrally formed therein, without stressing or resiliently expanding such pocket sidewalls, a pocket having an inner diameter of 8.8 to 9.0 mm. is formed.

Taking in mind that cells having an inner diameter of 8.0 mm. are desired, such flabby pockets should therefore be shrunk at an extent in the range of 10% to 12%. Now, recalling that the textile material may be further shrunk to 15%–17% about, the possible said further shrinking may be limited to the above range, during the treatment at 180° C., i.e. a contraction or shrinkage comprised between 3% and 7% about may be contrasted and prevented. It has been found that by contrasting such shrinkage so that an average 4% to 5% of the free contraction at 180° C. will be prevented, a very satisfyingly self-supporting and shape-retaining textile material may be produced with exactly sized, shaped and spaced cells integrally formed thereinto, as defined by size, shape and spacing of the forming bodies.

The critical contrasted heat-shrinking processing of the texture, about cylindrical forming bodies, individually inserted in the pockets of the flabby texture, and having the required 8.0 mm. diameter and spaced at 9.6 mm., measured between the axes of adjacent bodies, has been achieved by heating the texture not over 200° C., and preferably at a temperature of 180° to 190° C.

The heat was applied to said texture by making use of said forming bodies as heating elements. Each one of said forming bodies consists of a tubular metallic rod having a resistor located and insulatedly supported thereinto. The said heat might however differingly applied, by processing the material into a suitably selected and adjusted kiln, for example.

*Example 2*

There is described a mode of producing of an article as described in Example 1, but including the step of impregnating the textile polyester material when in its texture form in lieu of in its yarn form, according to Example 1.

The yarn material has been provided and the texture has been produced as described in the Example 1, except that the impregnation step of the yarn material has been omitted. Prior to weaving, said yarn material has been conventionally sized, to improve the weaveability thereof, and the sizing agent has been eliminated, upon weaving of the texture, by conventionally carried out cleansing steps.

An impregnating bath has been prepared as described in Example 1, but the batch thereof has been so provided that a minor content of resinous component had been included, namely of 3.5% to 4.0% of fully dispersed resin. The impregnation step has been carried out by rapidly passing the texture into the bath, followed by immediate calendering of said texture and subjecting such texture to air blast for prompt elimination of the liquid dispersing medium.

The minor amount of the resinous component required in the bath, in comparison with the batching of Example 1, for obtaining a comparable self-supporting and shape-retaining article of manufacture, if justified by the fact that, according to Example 1, a small but not negligible part of the resin applied to the yarn material, would be eliminated during the mechanical treatment of said yarn material, in particular during the weaving procedure, i.e. where such resin effectively acts as a sizing agent, as above described.

The said impregnating resin, applied to the texture, might cause a somewhat clogging of the pores thereof. It has been however found that such clogging will be fully eliminated during the subsequent contrasted heat-shrinking processing of the material, when the resin will be completely absorbed within the fibrous components of said texture.

A plate sheath produced according to the invention, such as according to any of the above examples, is advantageously comparable, from the standpoint of view of its service in a secondary or storage battery, to a corresponding plate sheath produced by processing, under the above discussed principle of contrastedly heat-shrinking the texture, a textile material consisting of resinous components capable to acquire the desired self-supporting and shape-retaining condition upon shrinking in stressed condition about forming bodies.

It has been further found that the impregnating resin, upon the above described processing of the impregnated polyester based textile material, and following to the complete elimination of the dispersing medium, will result in the finished article as thin coating film arranged about and in firm and intimate contact with the fibers, filaments and yarns of polyesters. Still further, it has been found that such coating noticeably improves the texture and the operation of the plate in the battery, as acting as an effective protection of the prevailing polyester component.

It is believed that such protective resinous coating would progressively be destroyed and eliminated during the service of the battery. Such elimination is not however of prejudice for the battery plate, as being well known that such plates may be and are commercially produced with unprotected or bare polyester material. Such resinous coating, therefore, whatsoever its life-time might be, will improve the polyester made plate sheath and correspondingly protract the service life-time thereof.

It is believed to be evident that the present invention includes several advantageous features, in particular a new textile structure adapted to be formed and stabilized in the shape and condition of a multi-cell plate sheath, as well as a new method for having the said textile material formed and stabilized as described above.

It will be understood too that each of the features described above or any combination thereof may also find an useful application in other types of sheath differing from the ones described above.

Without further analysis, the foregoing will so fully reveal the gist of the present invention than others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalents of the invention as defined in and by the appended claims.

Having thus described the invention and the method for producing same, what I claim as new and desire to have protected by Letters Patent is:

1. In the manufacture of plate sheaths for electric storage batteries of the type wherein a battery plate includes a plurality of individual elements of active material having a predetermined shape and size, and located in individual respective pockets of said sheath, the steps of preparing a heat-shrinkable fabric, said fabric including threads essentially consisting of synthetic linear polyester material impregnated with a vinyl chloride-acrylonitrile copolymer as a resinuous component of the type which when spun into a yarn has an oriented molecular structure, and said fabric having therein a plurality of pockets of said predetermined shape but in collapsed condition and of a large size; expanding said pockets to said predetermined shape; and subjecting said fabric to a temperature sufficient to shrink said fabric while limiting shrinkage of said pockets to said predetermined shape and size, whereby a structure is obtained having pockets of said predetermined shape and size and being shape retaining due to said resinous component forming part of said fabric.

2. A method according to claim 1 wherein said synthetic linear polyester material is impregnated with a dispersion of said resinous component in acetone and thereafter said acetone is substantially removed, and said impregnation is carried out so that the amount of said resinous component in said fabric will be between about 3 and 5%.

References Cited by the Examiner

UNITED STATES PATENTS

| | | | |
|---|---|---|---|
| 2,176,428 | 10/1939 | Kershaw | 136—55.3 |
| 2,305,121 | 12/1942 | Wheat | 136—55.3 |
| 2,343,970 | 3/1944 | Galloway | 136—55.3 |
| 2,420,456 | 5/1947 | White | 136—55.3 |
| 2,972,000 | 2/1961 | Boriolo | 136—43 |

FOREIGN PATENTS 836,262  6/1960  Great Britain.

JOHN H. MACK, *Primary Examiner.*

W. VAN SISE, *Assistant Examiner.*